United States Patent Office 2,962,429

Patented Nov. 29, 1960

2,962,429

METHOD OF MAKING ELECTRONIC TUBE GRID

Warner C. Wicke, Schenectady, N.Y., assignor, by mesne assignments, to the United States of America as represented by the Secretary of the Navy No Drawing. Filed Mar. 17, 1959, Ser. No. 800,065

4 Claims. (Cl. 204—143)

This invention relates to the making of an electronic tube grid having extremely thin wire of the type incorporated in tubes used in the centimeter wave region.

Very fine wire of certain materials like tungsten cannot be drawn down by the ordinary processes of wire drawing after it reaches a certain cross section because it lacks sufficient tensile strength and because a wire drawing die having the required aperture fineness does not retain the wire drawing diameter during a drawing operation.

If a wire such as tungsten wire mechanically drawn as fine as practicable is subjected to an etching operation to further reduce the diameter thereof to the desired size, the resultant fine wire is too weak to handle. Etching fine tungsten wire to reduce its diameter to the desired size embrittles the wire; excessive losses are encountered in any mechanical operation where etched fine tungsten wire is bent, tensioned, or twisted. This invention concerns etching wire after it has been secured on a frame to form a grid and when the wire will not be subsequently mechanically worked, namely, bent, tensioned, or twisted.

An object of this invention is to provide a comparatively simple and expeditious process of making an electronic tube grid having extremely thin wire, e.g. tungsten wire of uniform diameter and smooth surface and at a minimum cost, and with minimum waste.

Other objects and many of the attendant advantages of this invention will be readily appreciated as the same becomes better understood by reference to the following detailed description when considered in connection with the accompanying drawings wherein:

Broadly this invention involves making electronic tube grids having extremely thin wire by initially assembling the grid with considerably heavier-than-desired wire and afterwards etching the grid wires in place down to size uniformly and smoothly. The process may be used on grids of any configuration but its main advantage is apparent in connection with the manufacture of planar grids.

In planar grids there is a grid frame, generally shaped like a washer, made, for example, of tungsten and upon which the grid proper is held firmly. The grid may consist of parallel wires or a mesh. It may be be applied by winding the wire directly on the frame or by fabricating it in any form as, for example, a mesh, and then fastening it on the frame. It may be held firmly on the washer by welding, brazing, or any other method. It may be held in proper shape by tensioning during winding, or during brazing or by stretching or forming after having been fastened onto the washer.

In this invention, the grid is made in any of the above described ways, or any other way suitable for the purpose, except that the wire used is considerably thicker than desired in the final grid, the wire being of a size obtainable by commercial wire drawing methods and at a price economically feasible for the purpose. The initial wire diameter may be as much as ten times that of the wire in the final product, depending upon mechanical and economic considerations. The so prepared grid is then subjected to an etching operation; the grid wires are etched down to the desired size by chemical and/or electrolytic means or other means known in the art. Because the grid wires need not be mechanically disturbed after the etching operation, inherent mechanical weaknesses in the final grid, brittleness for example, introduced by the etching operation, do not lead to failure of the grid.

The following is one illustration of circumstances under which this invention was successfully practiced. Need arose for grids consisting of 0.012 inch thick tungsten washer with an outside diameter of 0.405 and an inside diameter of 0.170 inch and of a parallel array of uniform, smooth tungsten wires of 0.0003 inch, diameter spaced uniformly 0.001 inch apart, center to center, under tension, approaching the breaking point when cold, and covering the whole area of the aperture of the washer. There are several difficulties in the manufacture of such grids. First of all, it is very difficult to make uniform, smooth tungsten wire of about 0.0003 inch diameter in quantity; therefore the price is very high. Secondly, it is very difficult to uniformly wind or otherwise properly orient on a frame such fine tungsten wire. Thirdly, this diameter tungsten wire breaks very easily in handling if twisted or bent. These last two difficulties result in a low yield, adding unduly to the manufacturing expenses. In accordance with this invention the grid described above is made by any of the methods mentioned above, e.g., is wound but with a thicker wire, e.g. 0.0006 inch diameter. Such a wire is much more readily available than the finer 0.0003 inch diameter wire, much cheaper, and can be wound much easier with the proper tension without undue danger of breaking. The washer frame for the grid may be formed with two diametrically opposed flat edges over which edges the wire is wound. To reduce unit cost, a pair of back to back washers are wound together. The ends of each of the wire stretches are then brazed to the respective washer with copper making good electrical contact with the washer. The wires are parted along the interface edges of the back-to-back washers. A stopoff lacquer is painted over the brazed portion to protect the copper. Satisfactory masking also is obtained by covering the copper with an appropriately shaped rubber washer. A group of the grids along with several pieces of the 0.0006 tungsten wire are immersed into a 0.5% sodium hydroxide solution to which enough ammonium chloride was added to lower the pH to 10. The solution is at room temperature. Because the solution absorbs carbon dioxide from the atmosphere, its pH is constantly decreasing. The change in pH is taken into account and compensated for by increasing etching time and/or etching current as the pH decreases during the etching of successive groups of washers in the same solution. When the pH of the solution drops below 9 pH it is discarded. A small amount of sodium chloride up to 1% by weight is added to the solution to increase conductivity for increasing electrolytic current density and improving the etching action. If the current density is too high, the wires will not be etched uniformly and smoothly. One or more platinum cathodes are immersed in the solution. The cathodes are large compared to the grids, substantially spaced from the grids and distributed about the grids to obtain uniform etching action. Five to seven volts direct current is applied between the cathodes and the grids and the several pieces of tungsten wire for 0.5–2.0 minutes, the selected operating point varying with pH of the solution, conductivity of the solution, and temperature. Alternating current does not yield as uniform results as direct current. A skilled operator carrying out the etching operation will be able to estimate from pH, conductivity, and temperature, an interval in which the etching operation will be almost completed. When this amount of time elapses, the operator terminates the etching current and removes from the solution the several tungsten wires not part of the grids and measures their diameter by optical projection or other conventional measuring methods. After their diameter is measured, he estimates how much longer the etching operation must be continued before the desired wire diameter is obtained. Then the tungsten wires are put back into the solution and the voltage reapplied between the cathodes and the grids and the several wires. After the estimated time has elapsed, the measuring step is repeated. If further etching is needed the etching operation is resumed to complete the etching of the grid wires down to the diameter desired.

The grid wires etched as above are very uniform in diameter and extremely smooth. No attack on the grain boundaries was observed under the conditions described above. The tension of the wire remained essentially unchanged.

Obviously many modifications and variations of the present invention are possible in the light of the above teachings. It is therefore to be understood that within the scope of the appended claims the invention may be practiced otherwise than as specifically described.

I claim:

1. A method of making an electronic tube grid having extremely smooth tungsten wires of uniform diameter and secured taut across a tungsten frame where the wire cross section is smaller than can be obtained by wire drawing methods without considerable breakage loss and where electrolytic treatment following wire drawing to reduce the drawn wire cross section to said small cross section renders the wire too brittle to handle, which comprises: positioning across the frame taut stretches of tungsten wire of substantially uniform composition throughout and of a cross sectional size larger than the size of said grid wires and in a selected pattern, then brazing the ends of said taut stretches to the frame in good electrical contact with the frame, then masking the ends of such taut stretches were brazed to said frame with a material inert to a selected solution utilized in a tungsten removing electrolytic treatment, and then reducing the cross sectional dimensions of such taut stretches to the size of said grid wires by said tungsten removing electrolytic treatment on said stretches.

2. A method as defined in claim 1, wherein said wire is .0006 inch diameter before said tungsten removing electrolytic treatment and .0003 inch diameter after said tungsten removing electrolytic treatment and wherein said solution includes a 0.5% sodium hydroxide solution to which enough ammonium chloride is added to lower the pH to 10, and replacing said solution when its pH drops below 9, and wherein the tungsten removing electrolytic treatment includes immersing said grid and a cathode in spaced relationship in said solution and applying 5–7 volts direct current between said grid and said cathode for 0.5–2.0 minutes, and including small amounts of sodium chloride up to 1% by weight in the etching solution to increase current density and improve etching action, then removing the grid from said solution.

3. A method of making an electronic tube grid having uniform and extremely smooth tungsten wires secured taut across an aperture in a tungsten frame where the wire cross section is smaller than can be obtained by wire drawing methods without considerable breakage loss and where etching following wire drawing to reduce the drawn wire cross section to said small cross section renders the wire too brittle to handle, which comprises: positioning across the frame aperture stretches of tungsten wire of substantially uniform composition throughout and of a cross sectional size larger than said grid wire size and in a desired pattern, tensioning the wires to a tensile stress approaching the breaking point when cold, and then brazing the tensioned wire ends to said frame outside said aperture in good electrical contact with the frame whereby the secured wires are under tensile stress approaching the breaking point when cold, then masking the ends of such stretches where secured to said frame with a material that is substantially inert in a 0.5% sodium hydroxide solution to which enough ammonium chloride is added to lower the pH to 10, then immersing the grid and a platinum cathode in said solution, applying 5–7 volts direct current between said grid and said platinum cathode for a period of time sufficient to reduce the wire cross section to said grid wire size, removing the grid from the etching solution and washing and drying the grid.

4. A method of making a grid as defined in claim 3, wherein before electrolytic treatment, the wires are .0006 inch diameter and the wires are .0003 inch diameter after electrolytic treatment and wherein small amounts of sodium chloride up to 1% by weight are added to the electrolyte solution to increase current density and improve the electrolytic action and wherein the voltage is applied for 0.5–2.0 minutes.

References Cited in the file of this patent

UNITED STATES PATENTS

| | | |
|---|---|---|
| 1,157,288 | Blau | Oct. 19, 1915 |
| 2,287,122 | Norris | June 23, 1942 |
| 2,608,722 | Stuetzer | Sept. 2, 1952 |
| 2,722,623 | Law | Nov. 1, 1955 |

FOREIGN PATENTS

| | | |
|---|---|---|
| 647,049 | Great Britain | Dec. 6, 1950 |
| 27,360 | Great Britain | of 1911 |

OTHER REFERENCES

Blum et al.: Principles of Electroplating and Electroforming, 3rd Edition (1949), McGraw-Hill Book Co., pages 207–211.